(12) United States Patent
Ogasawara

(10) Patent No.: US 7,940,438 B2
(45) Date of Patent: May 10, 2011

(54) HOLOGRAM READING APPARATUS, HOLOGRAM READING METHOD, HOLOGRAM RECORDING APPARATUS AND HOLOGRAM RECORDING METHOD

(75) Inventor: Yasuhiro Ogasawara, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 404 days.

(21) Appl. No.: 12/114,026

(22) Filed: May 2, 2008

(65) Prior Publication Data

US 2009/0059328 A1 Mar. 5, 2009

(30) Foreign Application Priority Data

Aug. 30, 2007 (JP) .................................. 2007-224489

(51) Int. Cl.
*G03H 1/16* (2006.01)
(52) U.S. Cl. .......................................... 359/29; 359/30
(58) Field of Classification Search .................... 359/21, 359/29–32, 22
See application file for complete search history.

(56) References Cited

U.S. PATENT DOCUMENTS

| | | | | |
|---|---|---|---|---|
| 7,088,482 B2 * | 8/2006 | Edwards | ........................ | 359/11 |
| 7,239,594 B2 * | 7/2007 | Edwards | ........................ | 369/103 |
| 7,511,867 B2 * | 3/2009 | Yasuda et al. | ................... | 359/29 |
| 7,535,608 B2 * | 5/2009 | Kawano et al. | ................. | 359/29 |
| 7,576,899 B2 * | 8/2009 | Kanesaka et al. | ............... | 359/21 |
| 2008/0024848 A1 * | 1/2008 | Kawano et al. | ................. | 359/21 |
| 2008/0266624 A1 * | 10/2008 | Uno | ................................ | 359/21 |

* cited by examiner

*Primary Examiner* — Frank G Font
(74) *Attorney, Agent, or Firm* — Sughrue Mion, PLLC

(57) ABSTRACT

A hologram reading apparatus includes: a unit holding a hologram recording medium in which data page is recorded by irradiating as a single beam both reference light and signal light modulated by a spatial light modulator including a first pixel area for modulating the reference light and a second pixel area for modulating the signal light, a pitch of pixels in the first pixel area being different from that in the second pixel area; a Fourier transform lens subjecting reproduction light to a Fourier transformation; a filter disposed on a Fourier transform plane of the reproduction light by the Fourier transform lens, the filter shielding the reference light at a first spatial frequency band and transmitting the signal light at a second spatial frequency band; and a reading unit receiving the reproduction light transmitted through the filter and reading the data page modulated to the signal light included in the reproduction light.

7 Claims, 7 Drawing Sheets

HOLOGRAM READING APPARATUS, HOLOGRAM READING METHOD, HOLOGRAM RECORDING APPARATUS AND HOLOGRAM RECORDING METHOD

CROSS-REFERENCE TO RELATED APPLICATION

This application is based on and claims priority under 35 USC §119 from Japanese Patent Application No. 2007-224489 filed Aug. 30, 2007.

BACKGROUND (i) Technical Field

The present invention relates to a hologram reading apparatus, a hologram reading method, a hologram recording apparatus and a hologram recording method.

(ii) Related Art

Some of hologram recording techniques employ the so-called coaxial-type recording technique in which a hologram recording medium is irradiated with reference light and signal light as a single beam to thereby record a hologram formed by the interference between the reference light and the signal light in the hologram recording medium. One of the advantages resulted from the employment of the coaxial-type recording technique is that the hologram recording/reading apparatus can be miniaturized.

FIG. 6 shows a part of an optical system constituting a hologram recording/reading apparatus 2 in a related art. As shown in FIG. 6, the hologram recording/reading apparatus 2 is configured in a manner that a spatial light modulator 25 irradiates a hologram recording medium 100 with spatial-modulated reference light and spatial-modulated signal light as the same beam to thereby record data therein. On the other hand, in the case of reading data, only the reference light serving as a reading beam is irradiated to the hologram recording medium 100 to thereby reproduce a reproduction beam, then an iris 45 shields a reference light portion of the reproduction beam and a filter 47 disposed at the focal plane of a Fourier transform lens 46 extracts a desired spatial frequency band of the signal light. A light receiving element 50 reads data based on the extracted desired spatial frequency band of the signal light.

SUMMARY

According to an aspect of the invention, there is provided a hologram reading apparatus including:

a holding unit that holds a hologram recording medium in which page data is recorded by irradiating as a single beam both reference light and signal light which are modulated by a spatial light modulator, wherein the spatial light modulator includes a first pixel area for modulating the reference light and a second pixel area for modulating the signal light based on page data to be recorded, and a pitch of pixels in the first pixel area is different from that in the second pixel area;

a Fourier transform lens that subjects reproduction light, which is reproduced by irradiating the reference light to the hologram recording medium, to a Fourier transformation;

a filter disposed on a Fourier transform plane of the reproduction light by the Fourier transform lens, wherein the filter shields the reference light at a first spatial frequency band and transmits the signal light at a second spatial frequency band, based on that the reference light and the signal light which are included in the reproduction light differ from each other in distance of image formation positions of a spatial frequency component thereof; and a reading unit that receives the reproduction light transmitted through the filter and reads the page data modulated to the signal light included in the reproduction light.

BRIEF DESCRIPTION OF THE DRAWINGS

Embodiments of the present invention will be described in detail based on the following figures, wherein.

Figure 1:
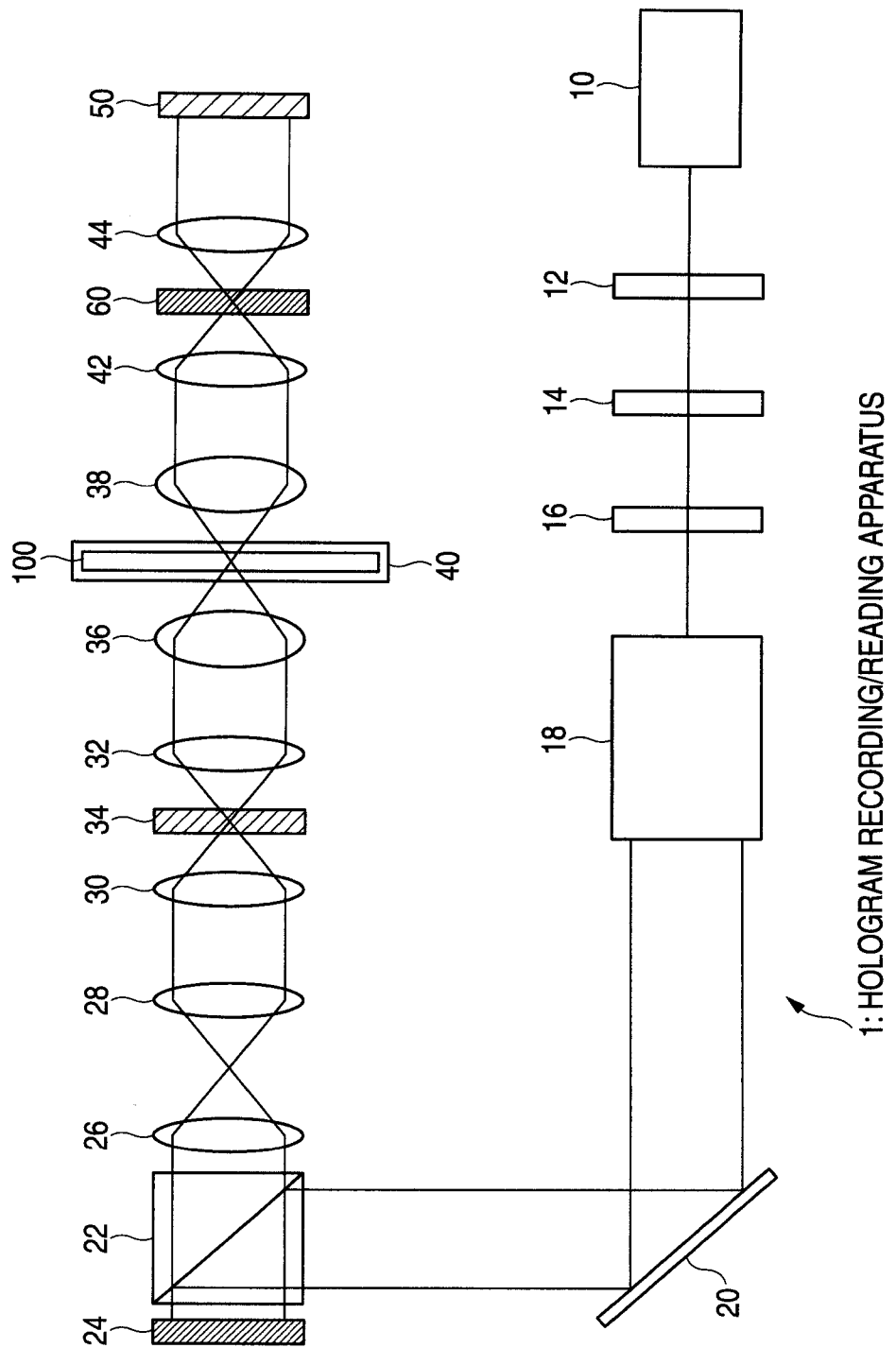
FIG. 1 is a diagram showing a hologram recording/reading apparatus according to an exemplary embodiment.

1 hologram recording/reading apparatus
2 hologram recording/reading apparatus (related art)
10 light source
12 shutter
14 half wave plate
16 polarizing plate
18 enlarging/collimating optical system
20 mirror
22 polarization beam splitter
24 spatial light modulator
25 spatial light modulator (related art)
26, 28 lens
30, 32 Fourier transform lens
34 filter
36, 38 Fourier transform lens
40 medium holding portion
42, 44 Fourier transform lens
45 iris
47 filter
50 light receiving element
60 filter
61 band-pass filter
100 hologram recording medium
200 reference light pixel area
300 signal light pixel area
400 0-order DC component
410 primary-order DC components of signal light
510 primary-order DC components of reference light

DETAILED DESCRIPTION

Hereinafter, an exemplary embodiment of the invention will be explained with reference to drawings.

FIG. 1 is a diagram showing a hologram recording/reading (reproducing) apparatus 1 according to an exemplary embodiment. As shown in FIG. 1, the hologram recording/reading apparatus 1 includes a light source 10, a shutter 12, a half wave plate 14, a polarizing plate 16, an enlarging/collimating optical system 18, a mirror 20, a polarization beam splitter 22, a spatial light modulator 24, lenses 26, 28 and Fourier transform lenses 30, 32 constituting a relay lens system, a filter 34, a Fourier transform lens 36 for focusing reference light or both the reference light and signal light in a hologram recording medium 100, a Fourier transform lens 38 for relaying transmitted light (reproduction light) transmitted through the hologram recording medium, a medium holding portion 40 for holding the hologram recording medium 100, Fourier transform lenses 42, 44 constituting the relay lens system, a filter 60 and a light receiving element 50.

The light source 10 irradiates coherent light acting as a light source of the signal light and the reference light for recording hologram. As the coherent light, a light source such as a laser beam having been known conventionally may be employed. As the laser beam, a laser beam of a waveform (for example, a green laser etc. having a wavelength of 532 nm) having the sensitivity at the optical recording layer of the hologram recording medium 100 may be employed.

The shutter 12 is provided on an optical path of the laser beam irradiated from the light source 10. The laser beam is interrupted in accordance with the opening/closing of the shutter 12. The laser beam passed through the shutter 12 further passes the half wave plate 14 and the polarizing plate 16 and so is adjusted in its light intensity and polarization direction.

The laser beam passed through the polarizing plate 16 is converted into collimated light with a diameter by the enlarging/collimating optical system 18. The laser beam thus converted into the collimated light by the enlarging/collimating optical system 18 enters into the polarization beam splitter 22.

The polarization beam splitter 22 transmits p-polarized light of the incident laser beam and reflects s-polarized light thereof. The laser beam reflected by the polarization beam splitter 22 enters into the spatial light modulator 24.

The spatial light modulator 24 polarizes and modulates the laser beam entered from the polarization beam splitter 22 in accordance with a pattern according to recording information. The recording information is represented by a pattern image of bright and dark in which digital data "0", "1" is made correspond to "bright", "dark", respectively. The laser beam having alight intensity modulation pattern subjected to the light intensity modulation enters again into the polarization beam splitter 22. In this case, since the polarization beam splitter 22 transmits the p-polarized light, the light modulated by the spatial light modulator 24 transmits the polarization beam splitter 22.

Figure 2:
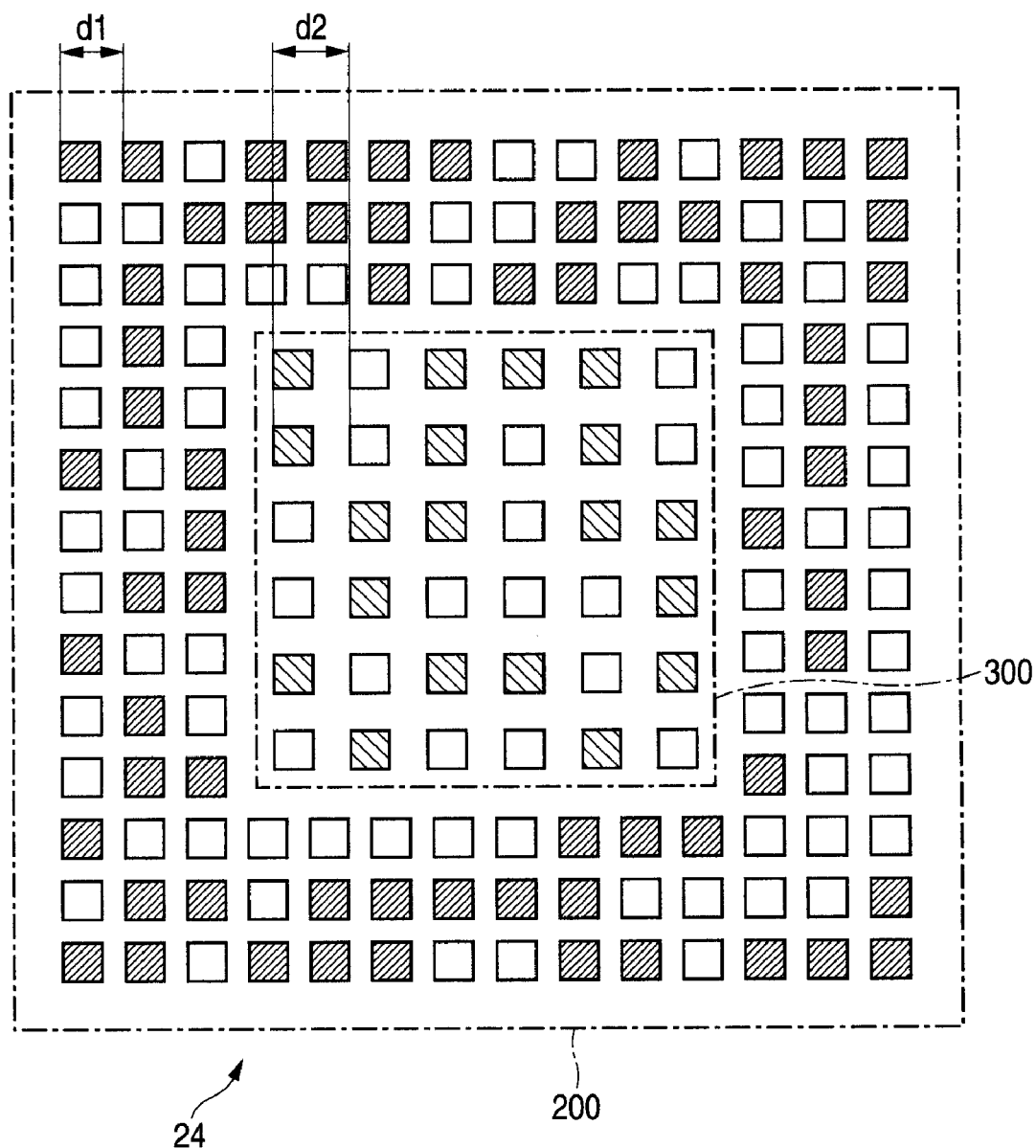
FIG. 2 is a diagram showing a spatial light modulator.

FIG. 2 shows an example of the configuration of the spatial light modulator 24. As shown in FIG. 2, the spatial light modulator 24 according to the embodiment is arranged to include reference light pixel area 200 for modulating the reference light and signal light pixel area 300 for modulating the signal light in a manner that the signal light pixel area 300 is disposed at the center portion and the reference light pixel area 200 is disposed at the outer periphery of the signal light pixel area 300.

Each of the reference light pixel area 200 and the signal light pixel area 300 is configured by a plurality of pixels and each of the pixels is intensity-modulated into bright or dark in accordance with two-dimensional image data for modulating the reference light and the signal light. In FIG. 2, the painted pixels in each of the reference light pixel area 200 and the signal light pixel area 300 represent "dark" pixels. In FIG. 2, the painted pattern representing the "dark" pixels is differentiated between the reference light pixel area 200 and the signal light pixel area 300 merely for the sake of the explanation, and actually each of the color and pattern of the "dark" pixels is not differentiated therebetween.

The pixels contained in the signal light pixel area 300 generate a two-dimensional image obtained by coding page data to be recorded and subject the signal light to the spatial modulation. Also, the reference light pixel area 200 may generate a two-dimensional image obtained by coding a random pattern and subject the reference light to the spatial modulation. The reference light is not necessarily modulated. However, when the reference light is subjected to the random modulation with a period almost same as that of the page data pattern, the reference light can be irradiated uniformly at the time of page data recording, whereby the overlapping of the signal light and the reference light is made large at the hologram recording area and hence page data can be recorded with good accuracy.

The spatial light modulator 24 according to the embodiment is characterized in that the pitch of the pixels contained in the reference light pixel area 200 differs from the pitch of the pixels contained in the signal light pixel area 300. That is, supposing that the pitch of the pixels contained in the reference light pixel area 200 is d1 and the pitch of the pixels contained in the signal light pixel area 300 is d2, d1 is smaller than d2 in this embodiment. The pitch of the pixels means a distance between the adjacent pixels contained in each of the pixel areas of the spatial light modulator 24. In this manner, since the pitch of the pixels for modulating the reference light and the pitch of the pixels for modulating the signal light in the spatial light modulator 24 are differentiated, the distance of each of the 0-order component and the primary-order component is differentiated between the reference light and the signal light. That is, the distance between the image formation positions of bright spots on the Fourier transform plane is differentiated between the reference light and the signal light. The embodiment simultaneously performs the cutting of the reference light and the extraction of a desired frequency band of the signal light by utilizing the difference of the distance between the image formation positions. This process will be explained later.

Recording light including the signal light and the reference light each subjected to the spatial modulation by the spatial light modulator 24 is relayed by the lenses 26, 28 constituting the relay lens system and entered into the Fourier transform lens 30. The recording light is focused by the Fourier transform lens 30 so as to pass the filter 34. A frequency band of the recording light is cut when passing through the filter 34. Since the frequency band of the recording light is cut by the filter 34, the recording more effectively utilizing the hologram recording medium 100 can be realized. The filter 34 may be constituted by a low pass filter for passing the DC component of the primary or less-order of the spatial frequency component of the reference light and the signal light. In this case, the radius of the transmission portion of the filter 34 is set to be $f\lambda/d1$ (the pitch of the pixels of the reference light) or more.

The recording light passed through the filter 34 is converted into collimated light again by the Fourier transform lens 32 and entered into the Fourier transform lens 36 for focusing the recoding beam in the hologram recording medium 100.

The Fourier transform lens 36 focuses the reference light and the signal light in the hologram recording medium 100 which is held by the medium holding portion 40. Then, hologram (interference fringe) formed by the interference between the reference light and the signal light at the position where the reference light and the signal light are focused is recorded in an optical recording layer of the hologram recording medium 100. The aforesaid explanation is a recording process for recording page data in the hologram recording medium 100.

Next, the explanation will be made as to a process of reading (reproducing) the page data recorded in the hologram recording medium 100 by the hologram recording/reading apparatus 1.

First, in the hologram recording/reading apparatus 1, only the reference light is irradiated to the hologram recording medium 100. The irradiated reference light is diffracted by the hologram formed in the hologram recording medium 100 and so reproduction light is obtained. The reproduction light thus obtained includes the reference light and the signal light irradiated at the time of forming the hologram.

Since the hologram recording medium 100 is a recording medium of a transmission type, the reproduction light transmits the hologram recording medium 100, then is relayed by the Fourier transform lens 38 and enters into the Fourier transform lens 42. The filter 60 is disposed on the focal plane of the Fourier transform lens 42.

Figure 3:
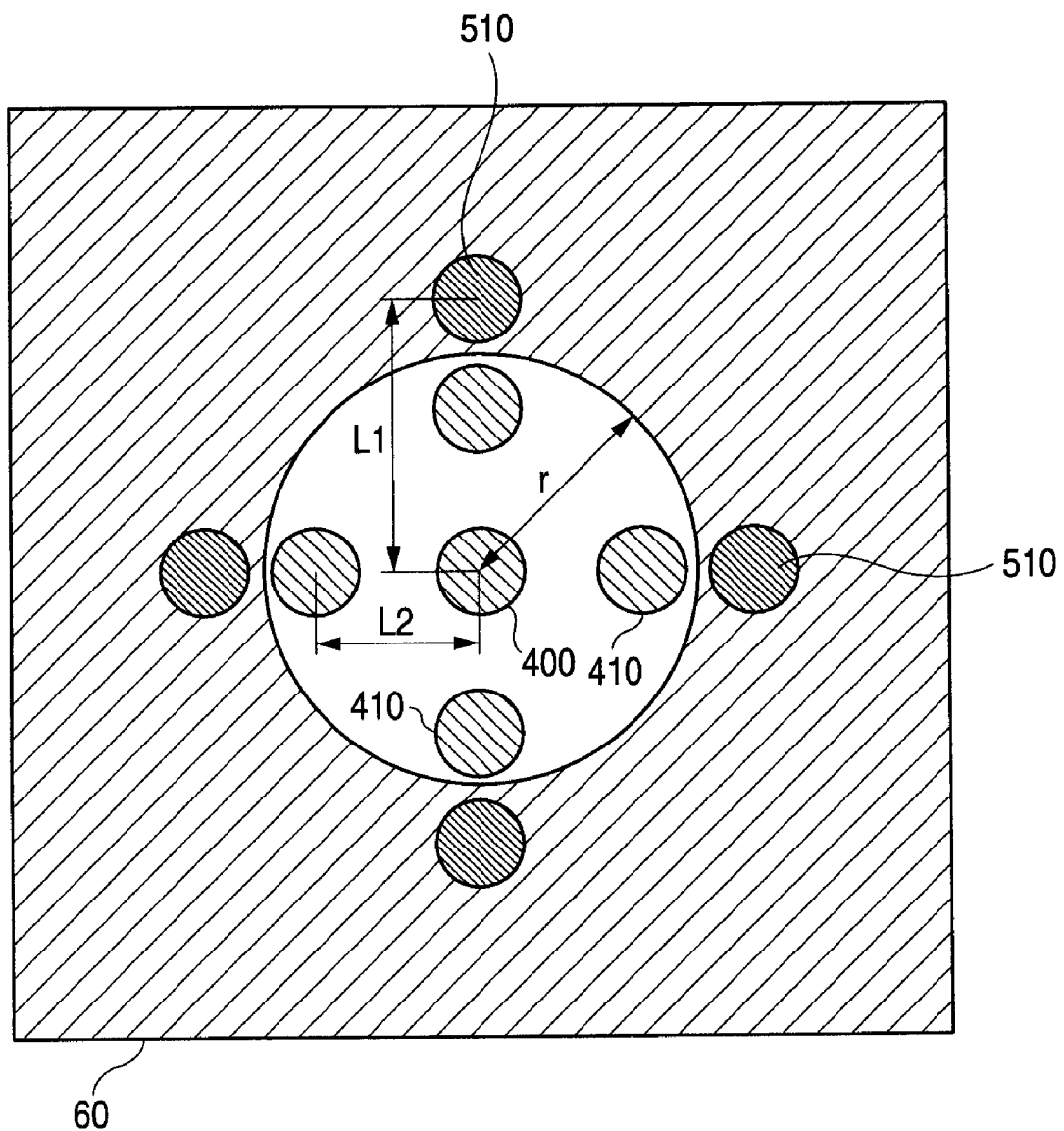
FIG. 3 is a diagram showing the focal plane of a lens and a filter.

FIG. 3 shows an example of the focal plane of the Fourier transform lens 42 (hereinafter called a Fourier transform plane) disposed at the filter 60. As shown in FIG. 3, a 0-order DC component 400 of the signal light is located at the center of the Fourier transform plane, and primary-order DC components 410 of the signal light are located around the 0-order DC component. Further, primary-order DC components 510 of the reference light are located on the outside of the primary-order DC component of the signal light. In this embodiment, a spot distance L1 of the reference light can be represented by the following expression (1) and a spot distance L2 of the signal light can be represented by the following expression (2), where d1 represents the pitch of the pixels of the reference light pixel area 200 and d2 represents the pitch of the pixels of the signal light pixel area 300 in the spatial light modulator 24, f represents the focal distance of the lens, and λ represents the wavelength of the coherent light. The spot distance means a distance between the 0-order component and the primary-order component.

$$L1 = f\lambda/d1 \quad (1)$$

$$L2 = f\lambda/d2 \quad (2)$$

When the filter 60 is configured as a low pass filter having a transmission portion with a radius r satisfying the relation of L2<r<L1 and is disposed at the Fourier transform plane, as shown in FIG. 3, the reference light can be cut from the reproduction light and only the signal light having the desired frequency band (the primary or less-order DC component) can be transmitted and extracted. When the wavelength λ of the coherent light is 532 nm, the focal distance f of the lens is 100 mm, the pitch d1 of the pixels of the reference light is 20 μm, the pitch d2 of the pixels of the signal light is 24 μm, L1 becomes 2.217 mm and L2 becomes 2.66 mm. When the filter is configured as a low pass filter having a radius r of 2.5 mm, the reference light can be cut from the reproduction light and the spatial frequency band of the primary or less-order DC component of the signal light can be extracted.

Since the filter 34 does not remove the reference light, the radius of the filter 34 is set to be larger than L1. That is, in the aforesaid numerical example, the primary-order DC component of each of the reference light and the signal light can be transmitted by setting the radius of the filter 34 to 2.7 mm The reproduction light (signal light) transmitted through the filter 60 is relayed by the Fourier transform lens 44 and focused on the light receiving element 50. The light receiving element 50 reads the recorded page data modulated in the signal light based on the light intensity modulation pattern of the signal light.

Figure 6:
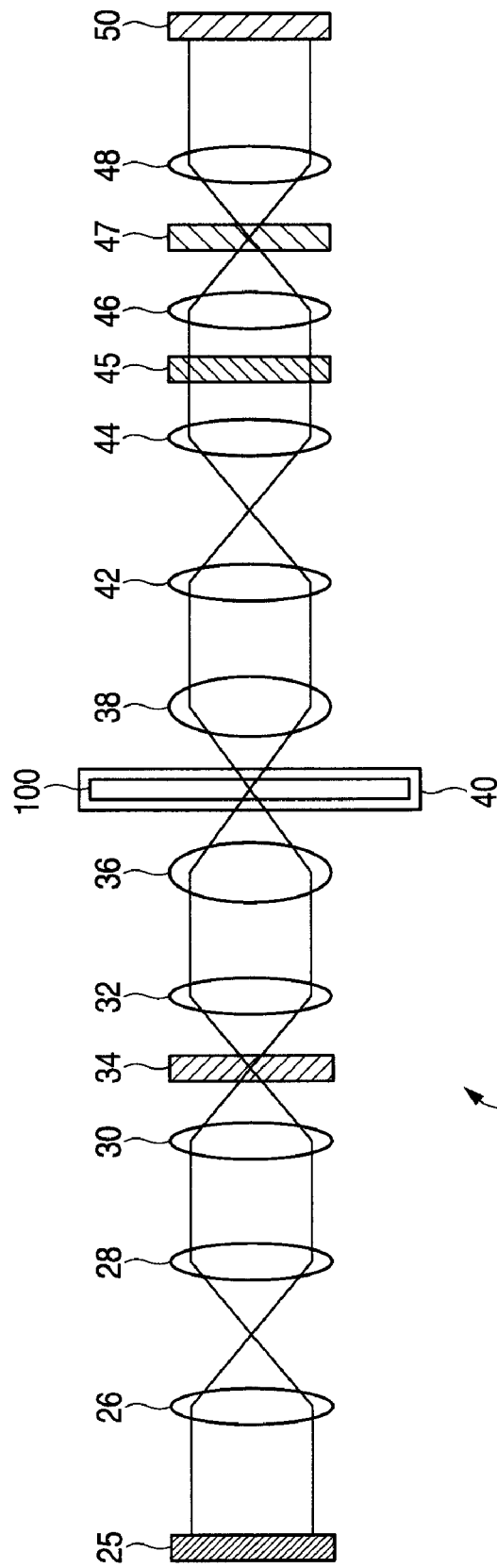
FIG. 6 is a diagram showing a part of a hologram recording/reading apparatus in a related art, wherein description of some reference numerals and signs are set forth below.

In the hologram recording/reading apparatus 1 according to the embodiment described above, since filter 60 simultaneously performs both the removal of the reference light from the reproduction light and the extraction of the desired frequency band of the signal light, as compared with the hologram recording/reading apparatus 2 of the related art shown in FIG. 6, the iris 45 and the Fourier transform lenses 42, 44 constituting the relay lens system can be eliminated and so the further miniaturization of the optical system can be realized.

The invention is not limited to the aforesaid embodiment.

Figure 4:
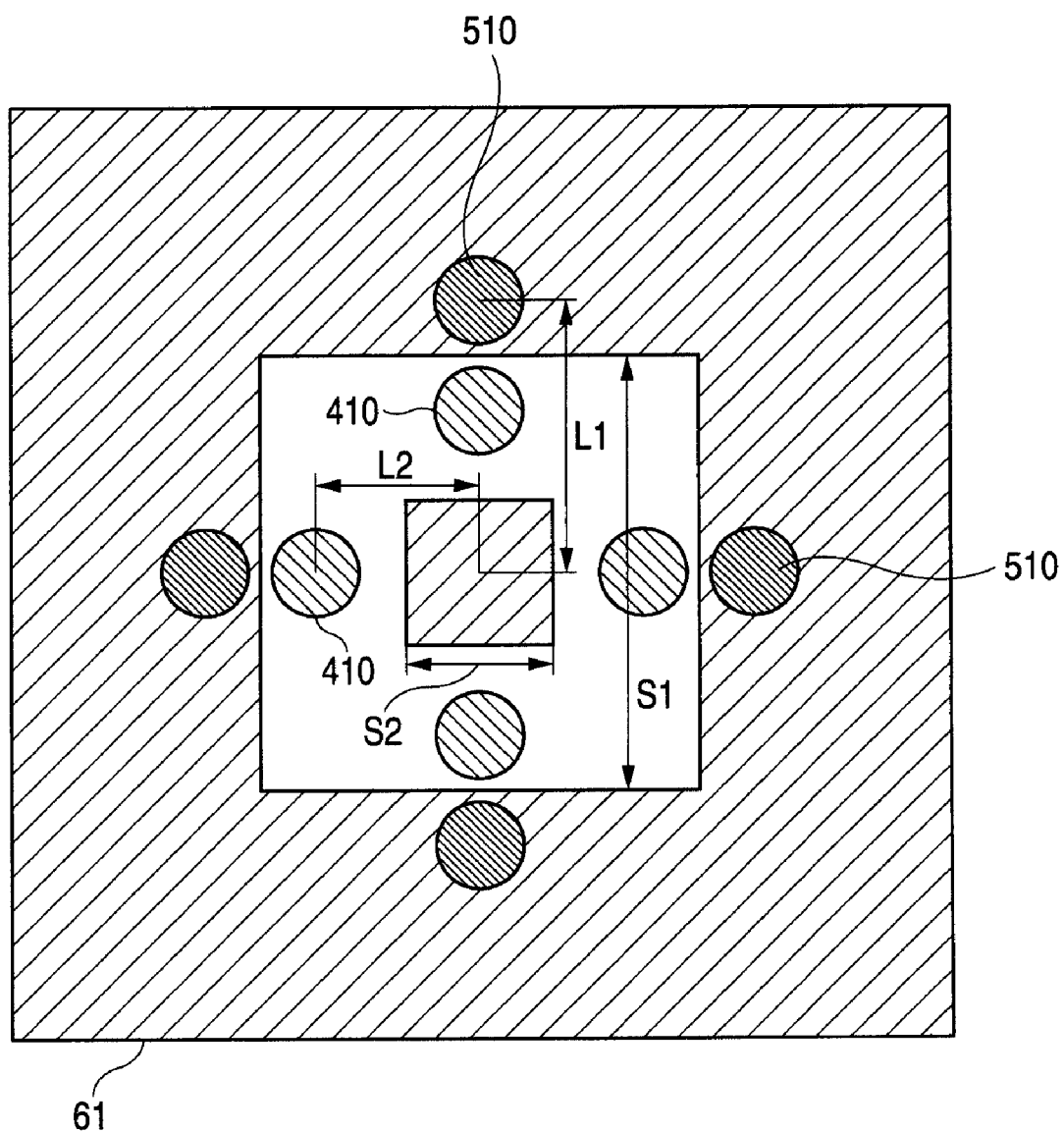
FIG. 4 is a diagram showing the focal plane of a lens and a filter.

For example, the filter disposed at the focal plane of the Fourier transform lens 42 is not limited to the low pass filter shown in FIG. 3. The filter may be configured as a band-pass filter, like a filter 61 shown in FIG. 4, which cuts the 0-order DC component of the signal light but transmits the frequency band including the primary-order DC component of the signal light. In this case, supposing that the transmission portion of the filter 61 is configured as a square shape in a manner that the size of each side of the outer periphery thereof is S1 and the size of each side of the inner periphery thereof is S2, the following expressions are satisfied.

$$L2 < S1/2 < L1, \ Rspot < S2/2 < L2$$

In this case, Rspot represents the radius of the spot. Of course, the filter disposed at the Fourier transform plane of the Fourier transform lens 42 is not limited to the configuration shown in the drawings and may be configured to have various shapes accorded to the desired spatial frequency band of the signal light to be transmitted.

Figure 5A:
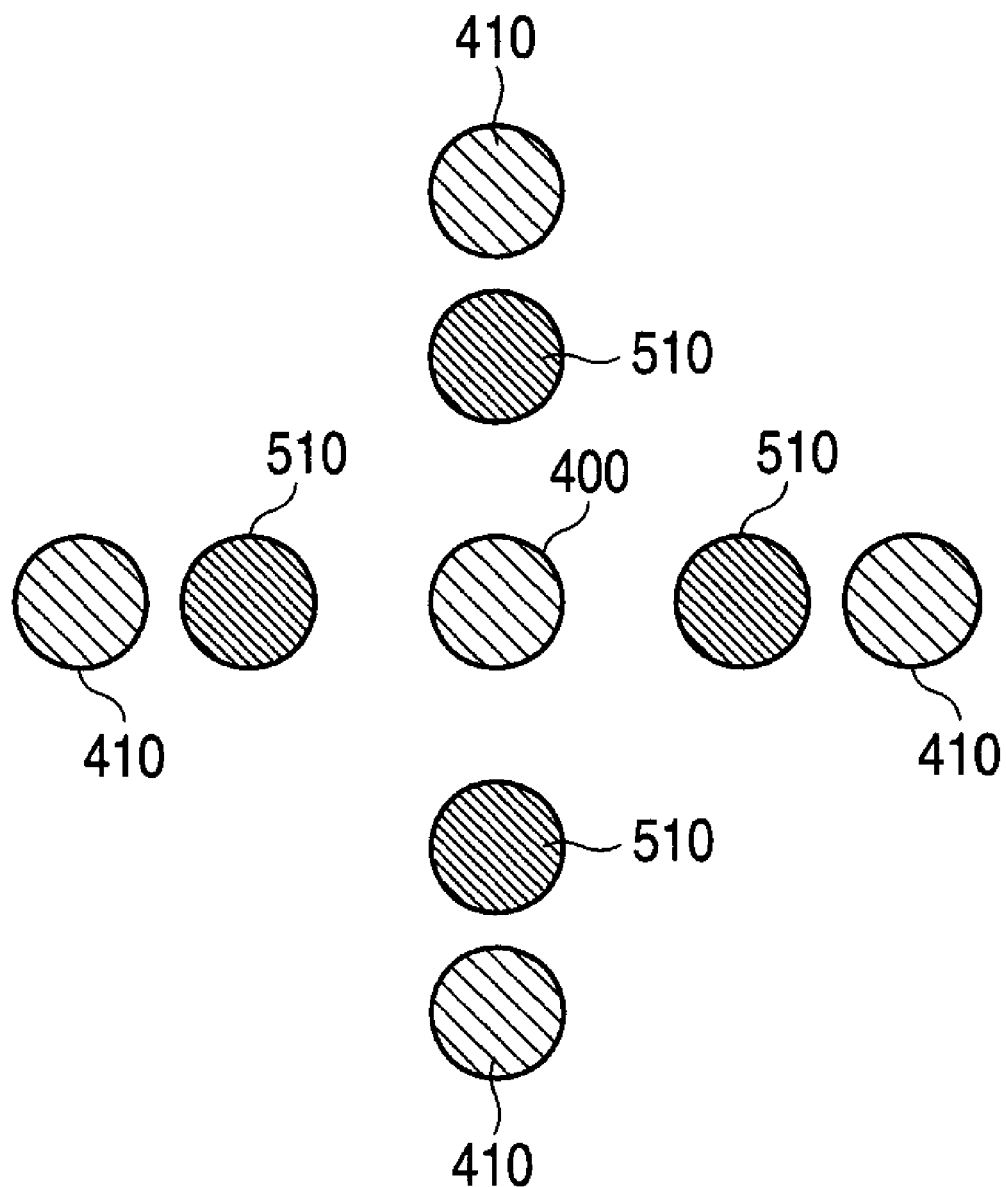
FIGS. 5A-5B are diagrams showing the focal plane of a lens and a filter.
Figure 5B:
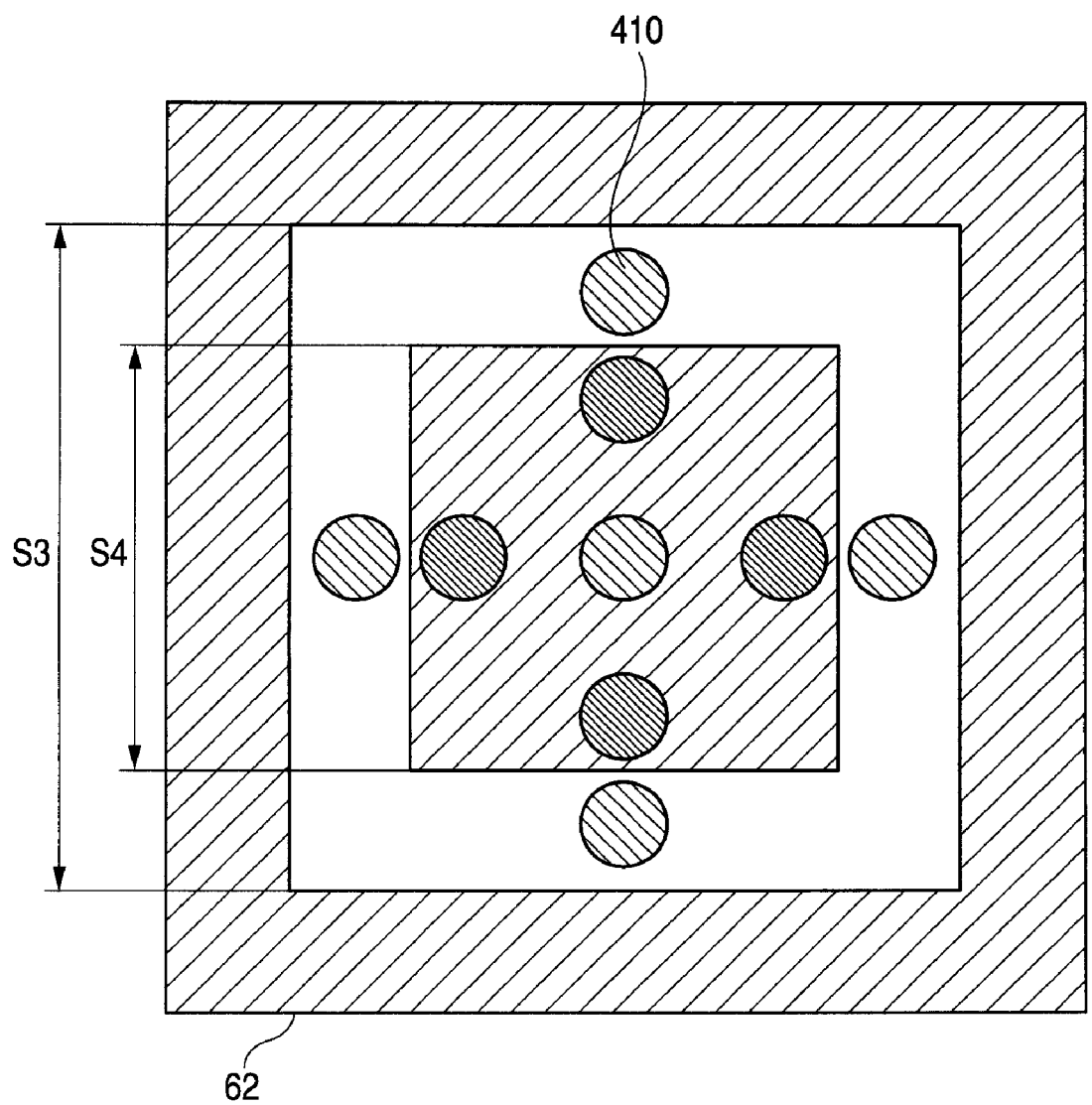

Further, although in the aforesaid embodiment, the pitch (d1) of the pixels of the reference light pixel area is set to be smaller than the pitch (d2) of the pixels of the signal light pixel area, the pitch (d1) of the pixels of the reference light pixel area is set to be larger than the pitch (d2) of the pixels of the signal light pixel area. In this case, according to the aforesaid expressions (1) and (2), the spot distance L2 of the signal light becomes longer than the spot distance L1 of the reference light on the Fourier transform plane. FIG. 5A shows the Fourier transform plane in this case. As also clear from FIG. 5A, the primary-order components 410 of the signal light locate at the outside of the primary-order components 510 of the reference light. In this case, when a filter 62 configured as shown in FIG. 5B is disposed at the focal plane of the Fourier transform lens 42, the reference light can be cut and only the spatial frequency band including the primary-order components 410 of the signal light can be transmitted. Supposing that the size of each side of the outer periphery of the transmission portion of the filter 62 is S3 and the size of each side of the inner periphery thereof is S4, S3 and S4 satisfy the relation of 2 L1<S3<2L2<S4<4L1. For example, when the wavelength λ of the coherent light is 532 nm, the focal distance f of the lens is 100 mm, the pitch d1 of the pixels of the reference light is 24 μm, the pitch d2 of the pixels of the signal light is 20 μm, L1 becomes 2.66 mm and L2 becomes 2.217 mm. In this case, when the filter 62 is configured as a band pass filter having S3 of 6.7 mm and S4 of 5 mm, the reference light can be eliminated from the reproduction light and the spatial frequency band including the primary-order DC component of the signal light can be extracted.

Further, although the aforesaid embodiment is arranged in a manner that the hologram recording/reading apparatus 1 performs both the recording and reading of hologram, a hologram recording apparatus for recording hologram and a hologram reading apparatus for reading hologram may be provided separately, of course.

What is claimed is:
1. A hologram reading apparatus comprising:
   a holding unit that holds a hologram recording medium in which page data is recorded by irradiating as a single beam both reference light and signal light which are modulated by a spatial light modulator, wherein the spatial light modulator includes a first pixel area for modulating the reference light and a second pixel area for modulating the signal light based on the page data to be recorded, and a pitch of pixels in the first pixel area is different from that in the second pixel area;

a Fourier transform lens that subjects reproduction light to a Fourier transformation, wherein the reproduction light is obtained by irradiating the reference light to the hologram recording medium and wherein the reproduction light includes the reference light and the signal light;

a filter disposed on a Fourier transform plane of the reproduction light by the Fourier transform lens, wherein the filter shields the reference light at a first spatial frequency band and transmits the signal light at a second spatial frequency band, based on that the reference light and the signal light which are included in the reproduction light differ from each other in distance of image formation positions of a spatial frequency component thereof; and a reading unit that receives the reproduction light at the second spatial frequency band transmitted through the filter and reads the page data modulated to the signal light at the second spatial frequency band.

2. The hologram reading apparatus according to claim 1, wherein the first spatial frequency band includes at least N-order DC component of the reference light, N being a natural number, and the second spatial frequency band includes the N-order DC component of the signal light.

3. The hologram reading apparatus according to claim 1, wherein the first spatial frequency band includes an N or more-order DC component of the reference light, N being a natural number, and the second spatial frequency band includes an N or less-order DC component of the signal light.

4. A method for reading a hologram, the method comprising:

holding a hologram recording medium in which page data is recorded by irradiating as a single beam both reference light and signal light which are modulated by a spatial light modulator, wherein the spatial light modulator includes a first pixel area for modulating the reference light and a second pixel area for modulating the signal light based on the page data to be recorded, and a pitch of pixels in the first pixel area is different from that in the second pixel area;

subjecting reproduction light to a Fourier transformation with a Fourier transform lens, wherein the reproduction light is obtained by irradiating the reference light to the hologram recording medium and wherein the reproduction light includes the reference light and the signal light;

shielding the reference light at a first spatial frequency band and transmitting the signal light at a second spatial frequency band, by a filter disposed on a Fourier transform plane of the reproduction light by the Fourier transform lens, based on that the reference light and the signal light which are included in the reproduction light differ from each other in distance of image formation positions of a spatial frequency component thereof; and receiving the reproduction light at the second spatial frequency band transmitted through the filter and reading the page data modulated to the signal light at the second spatial frequency band.

5. A hologram recording apparatus comprising:

a spatial light modulator including a first pixel area for modulating reference light and a second pixel area for modulating signal light based on page data to be recorded, a pitch of pixels in the first pixel area being different from that in the second pixel area; and an irradiating unit that irradiates a hologram recording medium with, as a single beam, the reference light and the signal light which are modulated by the spatial light modulator, so as to record the page data as a hologram in the hologram recording medium by the reference light and the signal light interfering with each other.

6. The hologram recording apparatus according to claim 5, wherein the pitch of pixels in the first pixel area is smaller than that in the second pixel area.

7. A method for recording a hologram, the method comprising:

modulating reference light and signal light by a spatial light modulator including a first pixel area for modulating the reference light and a second pixel area for modulating the signal light based on page data to be recorded, a pitch of pixels in the first pixel area being different from that in the second pixel area; and irradiating a hologram recording medium with the modulated reference light and signal light as a single beam, so that the reference light and the signal light interferes with each other to form and record a hologram in the hologram recording medium.

* * * * *